US012746887B2

(12) United States Patent
Song et al.

(10) Patent No.: US 12,746,887 B2
(45) Date of Patent: Sep. 29, 2026

(54) SYSTEMS AND METHODS FOR RESTRAINING A PASSENGER VIA A VARIABLE-STIFFNESS BLANKET

(71) Applicant: Toyota Motor Engineering & Manufacturing North America, Inc., Plano, TX (US)

(72) Inventors: Yuyang Song, Ann Arbor, MI (US); Shinnosuke Shimokawa, Ann Arbor, MI (US); Phouvadol P. Khouphongsy, Saline, MI (US); Umesh N. Gandhi, Farmington Hills, MI (US); Koray Benli, Ann Arbor, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 253 days.

(21) Appl. No.: 18/594,366

(22) Filed: Mar. 4, 2024

(65) Prior Publication Data

US 2025/0276666 A1 Sep. 4, 2025

(51) Int. Cl.
*B60R 22/14* (2006.01)

(52) U.S. Cl.
CPC .................................... *B60R 22/14* (2013.01)

(58) Field of Classification Search
CPC ......... B60R 21/06; B60R 21/08; B60R 22/14; B60R 2021/2078; B60R 2021/23153; B60R 2021/23161
See application file for complete search history.

(56) References Cited

U.S. PATENT DOCUMENTS 3,690,696 A * 9/1972 Lincoln .................... B60R 22/04 280/803
4,935,773 A * 6/1990 Meacham .............. G03B 27/20 355/92
5,529,341 A * 6/1996 Hartigan ................. B60R 21/06 5/118
7,236,865 B2 6/2007 Prakah-Asante et al.
(Continued)

FOREIGN PATENT DOCUMENTS

CN 109624671 A 4/2019
DE 3923725 A1 1/1991

OTHER PUBLICATIONS

Narang et al. "Transforming the Dynamic Response of Robotic Structures and Systems Through Laminar Jamming", IEEE Robotics and Automation Letters, vol. 3. 2017.
(Continued)

*Primary Examiner* — Joseph W Sanderson
(74) *Attorney, Agent, or Firm* — Christopher G. Darrow; Darrow Mustafa PC

(57) ABSTRACT

A passenger restraint system includes a sealed blanket. The sealed blanket is draped over a passenger. The passenger restraint system also includes a set of variable-stiffness material layers disposed within the sealed blanket. The variable-stiffness material layers have a flexible state and a rigid state. An anchor system is attached to the sealed blanket to fasten the sealed blanket to an interior cabin of a vehicle and a vacuum pump pulls a vacuum within the sealed blanket and transitions the variable-stiffness material layers from the flexible state to the rigid state.

20 Claims, 7 Drawing Sheets

(56) References Cited

U.S. PATENT DOCUMENTS

| | | | | |
|---|---|---|---|---|
| 7,303,209 | B2 * | 12/2007 | Kwok | B60R 21/08 280/749 |
| 7,631,896 | B2 * | 12/2009 | Jessup | B60R 21/06 280/748 |
| 7,658,410 | B2 * | 2/2010 | Kwok | B60R 22/14 297/464 |
| 8,733,819 | B1 | 5/2014 | Le et al. | |
| 10,308,101 | B2 * | 6/2019 | Kim | B60J 7/12 |
| 10,377,331 | B2 | 8/2019 | Freienstein et al. | |
| 10,597,917 | B2 | 3/2020 | Sutherland et al. | |
| 10,688,899 | B2 | 6/2020 | Kim et al. | |
| 10,981,529 | B2 | 4/2021 | Kim et al. | |
| 11,040,689 | B2 * | 6/2021 | Lin | B60R 21/231 |
| 11,305,726 | B2 * | 4/2022 | Svanberg | B60R 21/013 |
| 11,643,043 | B1 * | 5/2023 | Deng | B60R 21/01 280/728.2 |
| 2005/0114108 | A1 | 5/2005 | Cooper et al. | |
| 2006/0220365 | A1 * | 10/2006 | Kwok | B60R 21/08 280/749 |
| 2006/0249944 | A1 * | 11/2006 | Jessup | B60R 21/06 280/748 |
| 2007/0018442 | A1 * | 1/2007 | Kwok | B60R 21/08 280/749 |
| 2007/0152436 | A1 * | 7/2007 | Kwok | B60R 22/14 297/487 |
| 2019/0105973 | A1 * | 4/2019 | Kim | B60J 7/12 |
| 2020/0031308 | A1 * | 1/2020 | Svanberg | B60R 22/14 |
| 2020/0180543 | A1 * | 6/2020 | Lin | B60R 21/01554 |

OTHER PUBLICATIONS

Ou et al. "jamSheets: thin interfaces with tunable stiffness enabled by layer jamming", In Proceedings of the 8th International Conference on Tangible, Embedded and Embodied Interaction, p. 65-72. 2014.

* cited by examiner

SYSTEMS AND METHODS FOR RESTRAINING A PASSENGER VIA A VARIABLE-STIFFNESS BLANKET

TECHNICAL FIELD

The subject matter described herein relates, in general, to passenger restraint systems and, more particularly, to restraining a passenger in a vehicle via a variable-stiffness passenger restraint blanket.

BACKGROUND

Vehicles transport passengers between different locations. Vehicle usage is on the rise, with more passengers relying on some mode of transportation, in some cases daily, to carry out their activities. Vehicle usage is fraught with potential hazards, such as those triggered by weather conditions, conditions within the surrounding environment, and/or the behavior of other drivers, pedestrians, or a driver of the ego vehicle itself. For example, inclement weather conditions may reduce driver visibility and/or control. In these conditions, a driver's visibility of environmental objects may be reduced such that the driver may be more likely to collide with these objects. As another example, a vehicle may slip on a slick road. These problems are exacerbated as vehicle usage is on the rise. That is, even in prime weather and road conditions, the increase in the number of vehicles (and pedestrians) that occupy the roadways of the world increases the potential for hazardous interactions between vehicles and/or pedestrians. Passenger safety is a top area of focus for automobile manufacturers, with this area of focus becoming more relevant as the usage and autonomy of vehicles will likely increase.

SUMMARY

In one embodiment, example systems and methods relate to a manner of improving passenger restraint within a vehicle.

In one embodiment, a passenger restraint system for restraining a passenger via a variable-stiffness blanket is disclosed. The passenger restraint system includes a sealed blanket, the sealed blanket is draped over a passenger. A set of variable-stiffness material layers are disposed within the sealed blanket. The set of variable-stiffness material layers have a flexible state and a rigid state. The passenger restraint system also includes an anchor system attached to the sealed blanket to fasten the sealed blanket to an interior cabin of a vehicle and a vacuum pump to pull a vacuum within the sealed blanket and transition the variable-stiffness material layers from the flexible state to the rigid state.

In one embodiment, a passenger restraint system includes a sealed blanket, the sealed blanket is draped over a passenger. The passenger restraint system includes an anchor system attached to the sealed blanket to fasten the sealed blanket to an interior cabin of a vehicle. A set of variable-stiffness material layers are disposed within the sealed blanket. A sensor in the vehicle detects a triggering event and a vacuum pump, responsive to the triggering event, pulls a vacuum within the sealed blanket to transition the set of variable-stiffness material layers from a flexible state to a rigid state.

In one embodiment, a method for restraining a vehicle passenger is disclosed. In one embodiment, the method includes detecting, with a sensor of a vehicle, a triggering event for a passenger restraint system of the vehicle. The method also includes pulling a vacuum on an anchored sealed blanket of the passenger restraint system responsive to detecting the triggering event. Doing so transitions a set of variable-stiffness material layers within the anchored sealed envelope from a flexible state to a rigid state.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with improving passenger restraint systems in vehicles are disclosed herein. As previously described, passenger safety is a top area of focus for vehicle manufacturers. It is becoming more so due to the rise of vehicle usage and the advent and continued development of semi-autonomous and autonomous vehicles, where more of the control of the vehicle is taken out of the hands of a human driver. When vehicles were first introduced, passenger safety features such as seat belts were much less prevalent, if they existed at all. Over time, passenger safety technology enhancements have made vehicle travel much safer for passengers. However, further developments in passenger safety may increase passenger safety within a vehicle.

Accordingly, the present specification describes a multi-functional blanket used as a restraint system for a vehicle passenger. The blanket has multiple states. In a first state, the blanket is flexible and may be draped over a passenger for comfort or warmth. In a second state, the blanket, or portions of the blanket, are made rigid. The blanket is anchored to the interior of the vehicle such that the anchors and the rigid blanket secure the passenger against harmful movement that may result during a crash, impact, or other hazardous event.

A jamming structure inside the blanket provides the stiffness. Layer jamming includes increasing the stiffness/rigidity of a structure by increasing friction forces between layers of the structure. In a first state, the structure is flexible and malleable to contour over an object. The structure becomes rigid and stiff once the friction forces between layers increase. In the present specification, compliant material layers are disposed inside the blanket. These layers are made rigid by pulling a vacuum on the layers. The vacuum increases the friction between adjacent layers such that the layers become rigid. As such, the layers can contour to a passenger in the flexible state. In the rigid state, the layers become rigid.

The blanket is affixed to the vehicle body in several locations 1) to ensure the blanket stays in position over the passenger and 2) to, when rigid, restrict the passenger's movement during the crash, impact, or other hazardous event. As such, the blanket, in cooperation with the anchors, prevents the passenger's undesired and potentially dangerous movement during a crash, impact, or other hazardous event. In an example, increasing the stiffness of the blanket is responsive to a crash or in anticipation of an impending crash. As such, the blanket may be coupled to sensors within the vehicle that detect a crash or imminent crash to determine when to apply the blanket-stiffening vacuum pressure. In this way, the disclosed systems, methods, and other embodiments improve passenger restraint and safety during vehicular travel.

Figure 1:
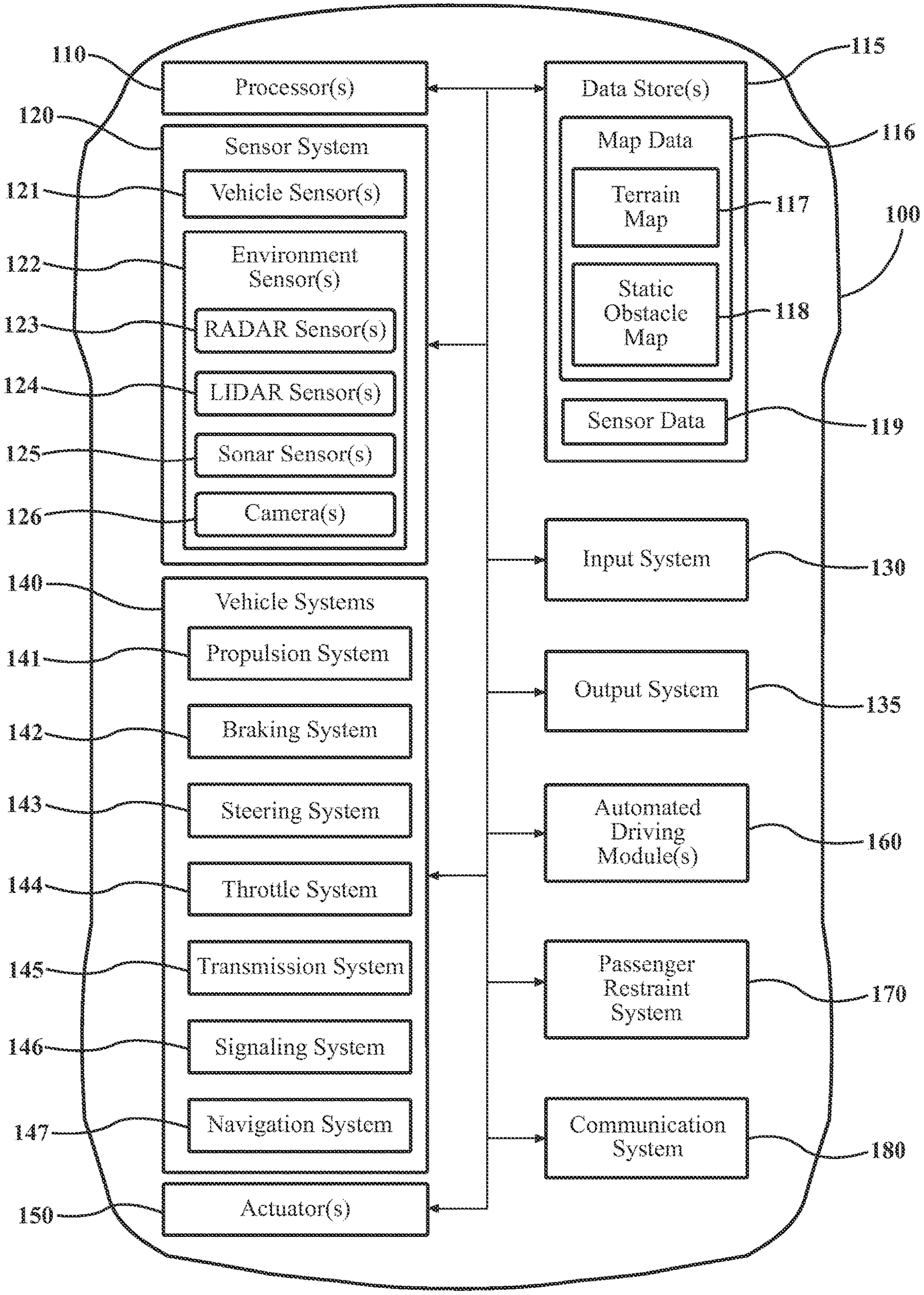
FIG. 1 illustrates one embodiment of a vehicle within which systems and methods disclosed herein may be implemented.

Referring to FIG. 1, an example of a vehicle 100 is illustrated. As used herein, a "vehicle" is any form of transport that may be motorized or otherwise powered. In one or more implementations, the vehicle 100 is an automobile. While arrangements will be described herein with respect to automobiles, it will be understood that embodiments are not limited to automobiles. In some implementations, the vehicle 100 may be a robotic device or a form of transport that, for example, carries passengers, and thus benefits from the functionality discussed herein associated with enhancing passenger safety during crashes or other hazardous situations.

The vehicle 100 also includes various elements. It will be understood that in various embodiments it may not be necessary for the vehicle 100 to have all of the elements shown in FIG. 1. The vehicle 100 can have different combinations of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances. For example, as discussed, one or more components of the disclosed system can be implemented within a vehicle 100 while further components of the system are implemented within a cloud-computing environment or other system that is remote from the vehicle 100.

Some of the possible elements of the vehicle 100 are shown in FIG. 1 and will be described along with subsequent figures. However, a description of many of the elements in FIG. 1 will be provided after the discussion of FIGS. 2-8 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In any case, the vehicle 100 includes a passenger restraint system 170 that is implemented to perform methods and other functions as disclosed herein relating to improving passenger safety by restraining the passenger via a variable-stiffness blanket.

In an example, the passenger restraint system 170, as provided for within the vehicle 100, functions in cooperation with a communication system 180. In one embodiment, the communication system 180 communicates according to one or more communication standards. For example, the communication system 180 can include multiple different antennas/transceivers and/or other hardware elements for communicating at different frequencies and according to respective protocols. The communication system 180, in one arrangement, communicates via a communication protocol, such as a WiFi, DSRC, V2I, V2V, or another suitable protocol for communicating between the vehicle 100 and other entities in the cloud environment. Moreover, the communication system 180, in one arrangement, further communicates according to a protocol, such as global system for mobile communication (GSM), Enhanced Data Rates for GSM Evolution (EDGE), Long-Term Evolution (LTE), 5G, or another communication technology that provides for the vehicle 100 communicating with various remote devices (e.g., a cloud-based server).

Figure 2:
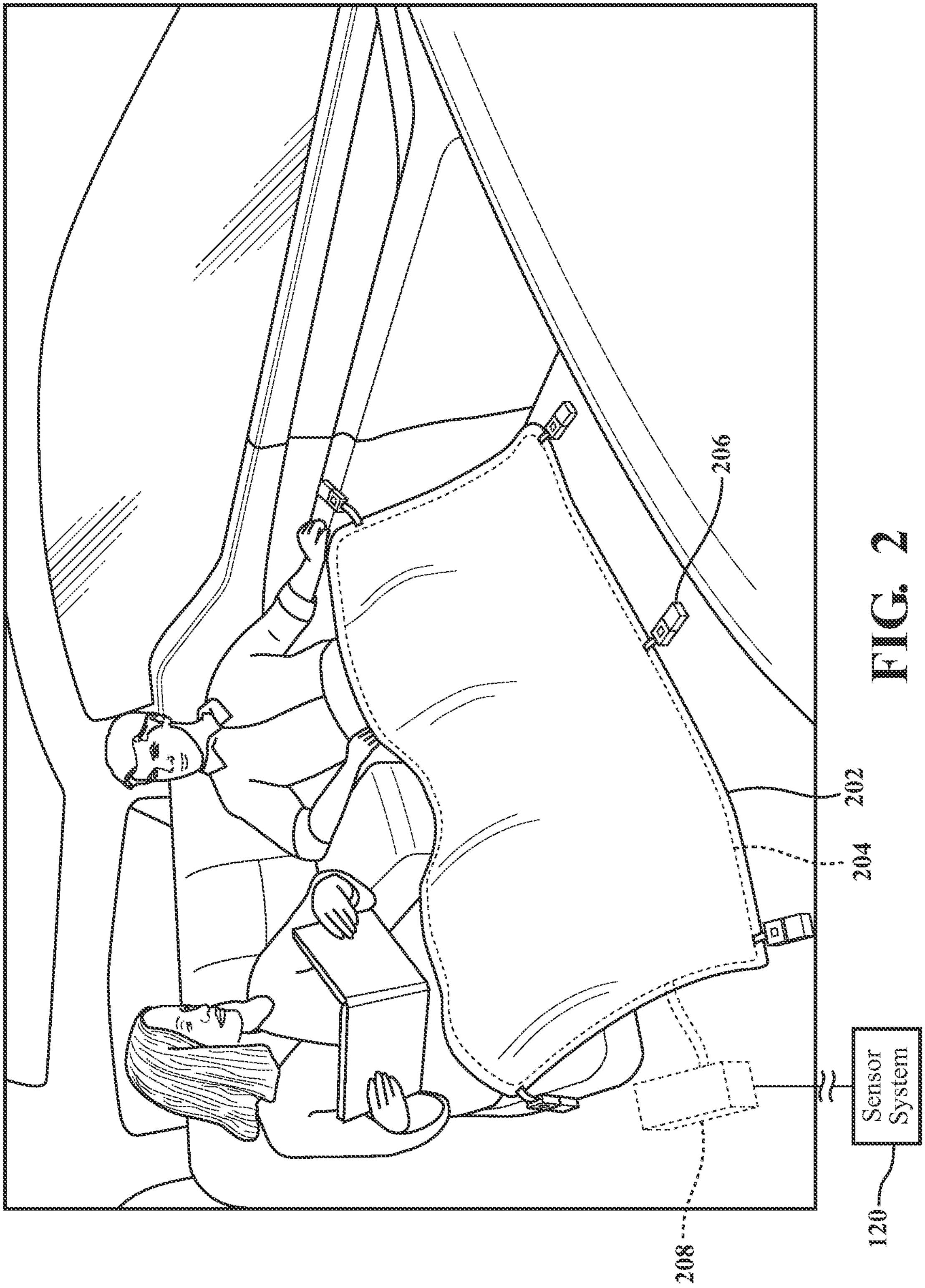
FIG. 2 illustrates one embodiment of a passenger restraint system in a flexible state that is associated with restraining a vehicle passenger via a variable-stiffness blanket.

FIG. 2 illustrates one embodiment of a passenger restraint system 170, in a flexible state, that is associated with restraining a vehicle passenger via a variable-stiffness blanket 202. As described above, in a first state, the variable-stiffness blanket 202 is flexible or malleable such that it may be draped over and contour to the shape of the passengers. As depicted in FIG. 2, the blanket 202 may fall across the torso and legs of the passengers in the vehicle 100. As such, the blanket 202 may be formed of various flexible materials, such as wool, cotton, woven acrylic, knitted polyester, and fleece, among other materials. In any case, the blanket 202 is an airtight structure. That is, as described above, the blanket 202 may include a jamming structure 204 that stiffens responsive to a pressure gradient provided by a vacuum pump 208. Accordingly, the blanket 202 may be airtight or sealed to ensure that no air permeates into the interior portion of blanket 202 to frustrate the removal of air from within the interior portion of the blanket 202. As such, in the first state, the blanket 202 provides comfort to the passenger and potentially warms the passengers by trapping radiative body heat.

Figure 4:
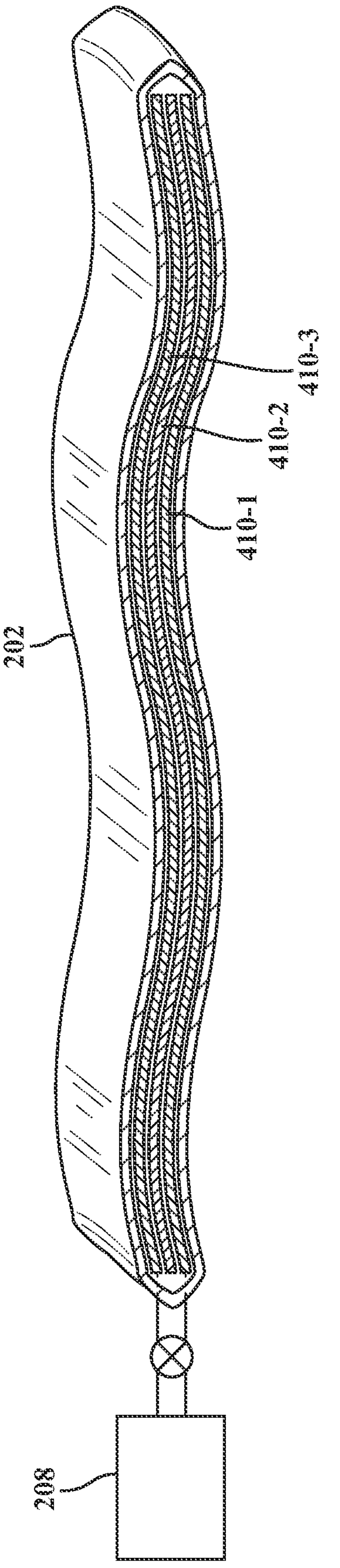
FIG. 4 illustrates a cross-sectional view of the set of variable-stiffness material layers of a passenger restraint system.
Figure 5:
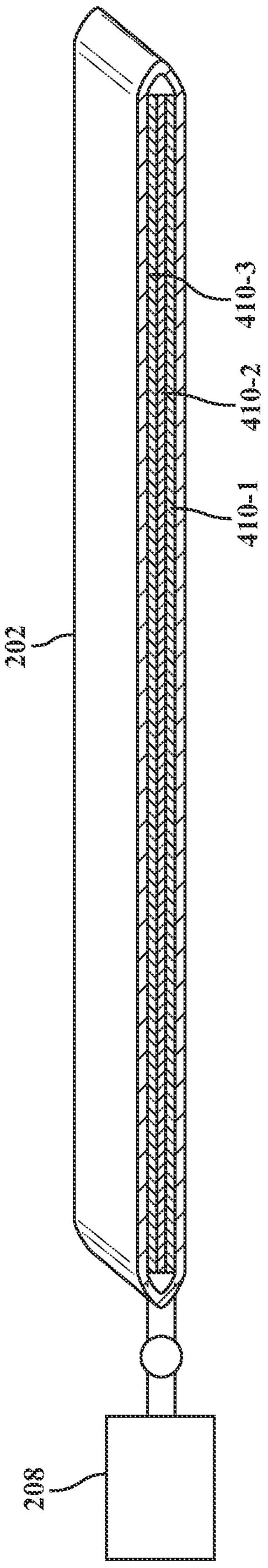
FIG. 5 illustrates a cross-sectional view of the set of variable-stiffness material layers of a passenger restraint system.

As described above, a jamming structure 204 is formed within an interior cavity of the blanket 202. For example, the interior cavity of the blanket 202 may house a set of variable-stiffness material layers that have 1) a flexible state and 2) a rigid state. FIG. 2 depicts the jamming structure 204 of variable-stiffness layers in dashed lines to indicate its position within the interior cavity of the blanket 202. As depicted in FIG. 2, the jamming structure 204 may occupy an entire interior cavity of the blanket 202 as large sheets. In other examples, such as that depicted in FIG. 6, the jamming structure 204 of variable-stiffness material layers may be formed as strips through different portions of the blanket 202. In either example, the jamming structure 204 may include multiple layers of compliant material that are flexible in the first state but become rigid and stiff upon removing air from within the interior cavity via the vacuum pump 208. FIGS. 4 and 5, described below, depict the various layers and the effect of drawing a vacuum on those layers and the blanket 202. The variable-stiffness material layers may be formed of different types of flexible material. In one example, the material layers are cellulose-based, such as paper. However, the layers may be formed of other materials, such as thin-film plastics or polymer-based sheets.

In addition to the features described above, the blanket 202 body may include other components. For example, the blanket 202 may include heating channels, such as insulated electrical heating wires distributed throughout the blanket 202. When plugged in, a temperature control unit manages an amount of current passing through the channels to generate heat, which is transferred to the passenger. In another example, the blanket 202 body may include cooling channels and a pump, which transport a cooling fluid through the blanket 202 to cool a passenger. While particular reference is made to particular blanket 202 features, the blanket 202 may include any number of features to increase the aesthetics, comfort, and/or utility of the blanket 202 to a vehicle passenger. For example, the blanket 202 may include pockets to retain devices such as drink bottles, smartphones, reading lights, or other objects.

In addition to the blanket 202, the passenger restraint system 170 includes an anchor system attached to the blanket 202 to fasten the blanket 202 to an interior cabin of the vehicle 100. For simplicity, in FIG. 2 a single instance of an anchor 206 is indicated with a reference number. As described above, during an impact or collision with another vehicle or any other hazardous events such as slipping on a low-friction surface and/or vehicle rollover, movement of the passenger relative to the vehicle 100 may cause harm to the passenger. As such, the intent of any passenger restraint system, including the passenger restraint system 170 of the present application, is to prevent potentially harmful movement of the passenger relative to the vehicle 100 that may arise due to the forces present during the hazardous event. In other words, the passenger restraint system 170 aims to keep the passenger in the vehicle 100, particularly in their seat, during an event. The anchor system fixes the edges of the blanket 202 such that any passenger under its surface is held in place. In an example, the anchor system includes multiple anchors 206 fastening the sealed blanket 202 to the interior cabin of the vehicle 100 at different anchor points. More specifically, the anchors 206 of the anchor system are attached to the edges of the jamming structure 204 such that the anchoring functionality of the anchors 206 and the rigidity of the jamming structure 204 retain the passenger in a particular location to prevent the passenger from being dislodged during an impact, collision, or other hazardous circumstance. In the example depicted in FIG. 2, the anchors are depicted as buckles. However, the anchors 206 may take various forms, including magnetic connectors, electromagnetic connectors, and/or snaps. In any case, one end of an anchor 206 attaches to the jamming structure 204, and another end of the anchor 206 attaches to a fixed point within the interior cabin of the vehicle 100. For example, the anchors 206 may be attached to a steel frame member of the vehicle 100, a floor of the vehicle 100, a frame of the seat of the vehicle 100, or any other rigid component within the vehicle 100. While FIG. 2 depicts the anchors 206 as attaching to particular points within the interior cabin of the vehicle 100, the anchors 206 may attach to other sturdy locations of the interior of the vehicle 100.

The passenger restraint system 170 also includes a vacuum pump 208 to pull a vacuum within the sealed blanket 202 to transition the variable-stiffness material layers of the jamming structure 204 from the flexible state to the rigid state. More specifically, as described above, the jamming structure 204 is stiffened by increasing the friction between adjacent variable-stiffness material layers. As such, the vacuum pump 208 removes any air gaps/pockets between adjacent layers to increase the contact area and friction between the adjacent layers. Doing so stiffens the layers such that the jamming structure 204, in cooperation with the anchors 206, absorbs impact energy and prevents the passenger from dislodging. The vacuum pump 208 is connected to the interior cavity of the blanket 202 via a number of tubes. In an example, the vacuum pump 208 is disposed within the vehicle 100, albeit obscured by interior cabin panels, flooring, etc. In FIG. 2, the vacuum pump 208 is indicated in a dashed line to indicate its position within the interior of the cabin, albeit obscured behind a flooring of the vehicle 100.

In one particular example, the passenger restraint system 170 includes multiple vacuum pumps 208 to draw the vacuum more quickly. That is, as described above, the vacuum pump 208 may be activated responsive to a detected crash. As such, removing air from the blanket 202 in one second or less may be desirable. In this example, the vacuum force of a single vacuum pump 208 or multiple vacuum pumps 208 may be such that the air in the blanket 202 may be removed in a second or less. Implementing multiple vacuum pumps 208 may reduce the time to pull the vacuum throughout the blanket 202.

In an example, the vacuum pump 208 pulls the vacuum responsive to a triggering event, which may be a hazardous event or an indication of an anticipated hazardous event. For example, as described above, vehicle travel inherently is dangerous due to at least weather conditions, road conditions, driver behavior, and the number of other vehicles and pedestrians that populate roadways or use infrastructure (e.g., sidewalks, crosswalks) that are in the vicinity of the roadways. In some examples, the vehicle 100 includes a sensor system 120, which is made up of environment sensors 122 that sense a surrounding environment (e.g., external) of the vehicle 100 and vehicle sensors 121 that sense information about the vehicle 100 itself. In this example, an output of one or more of these sensors triggers the activation of the vacuum pump 208 to pull a vacuum and stiffen the jamming structure 204. That is, the vacuum pump 208 pulls the vacuum responsive to a hazardous event indicated by at least one of a vehicle sensor 121 of the vehicle 100 or an environment sensor 122 of the vehicle 100. In one particular example, the vacuum pump 208 pulls the vacuum responsive to a pre-crash event indicated by at least one of a vehicle sensor 121 of the vehicle 100 or an environment sensor 122 of the vehicle 100. Specific examples are provided below.

In an example, a vehicle 100 includes a crash sensor that detects the collision of the vehicle 100 with another vehicle or object. In one example, a crash sensor is a pressure sensor disposed on a portion of the vehicle 100, such as a front bumper, door panel, or various pillars within the vehicle 100. When pressure resulting from a collision is detected, the pressure sensor generates an electrical signal transmitted in milliseconds to certain passenger safety systems, such as an airbag control unit to deploy an airbag. In this example, this vehicle sensor may also be coupled to the vacuum pump 208 to trigger pulling a vacuum on the blanket 202 to stiffen the jamming structure 204 within.

In other examples, different sensors of the sensor system 120 may trigger the stiffening of the passenger restraint blanket 202. For example, tire and/or steering wheel sensors may identify a slip rate for the tires of the vehicle 100 being greater than a threshold amount, which may indicate that the tires are slipping on a low-friction road surface, such as an icy or wet road. Similarly, in this example, the sensor system 120 may be communicatively coupled to the vacuum pump 208 such that when such conditions are detected, the vacuum pump 208 activates to pull a vacuum within the blanket 202, restrain the passenger, and prevent inertial forces from dislodging the passenger from their position in a seat of the vehicle 100.

In one particular example, the hazardous event may be a pre-crash event. That is, certain sensors of the sensor system 120 may be able to predict an imminent accident. As a particular example, the environment sensors 122 of the vehicle 100 capture images or other sensor outputs of the surrounding environment of the vehicle 100. A processor 110 of the vehicle 100 may process the output of these cameras and/or other sensors to determine the relative change in the position of detected objects. If a detected object is approaching the vehicle 100, or the vehicle 100 is approaching the detected object, at a rate wherein a collision is inevitable, the passenger restraint system 170, specifically a controller of the passenger restraint system 170, may activate the vacuum pump 208 to pull a vacuum before the inevitable event occurs. For example, it may be that a vehicle in front of the ego vehicle 100 has applied its emergency brakes to stop. Based on the speed of the ego vehicle 100 and the distance from the ego vehicle 100 to the stopped vehicle, a processor 110 may determine that the ego vehicle 100 will not be able to stop to avoid a collision with the stopped vehicle. In this example, the processor 110 may activate the vacuum pump 208 to pull a vacuum and stiffen the blanket 202 before the crash event. While particular reference is made to particular types of sensors that may detect a hazardous event such as a collision, impact, or pre-crash event, other sensors and sensors placed in different positions within the vehicle 100 may be relied on to trigger activation of the vacuum pump 208 of the passenger restraint system 170.

As such, the present passenger restraint system 170 provides a passenger with a blanket 202 that may be draped across the passenger to keep the passenger warm (or cool) and comfortable. The blanket 202 includes a jamming structure 204 formed of a set of variable-stiffness material layers to hold the passenger in place during a crash. During jamming, the blanket 202 remains contoured to the form of the passenger. In its stiff state, the blanket 202, along with the anchor system, maintains the blanket 202 and underlying passenger in place, thus preventing unwanted movement of the passenger relative to the vehicle 100 during a hazardous event and absorbing impact energy.

Figure 3:
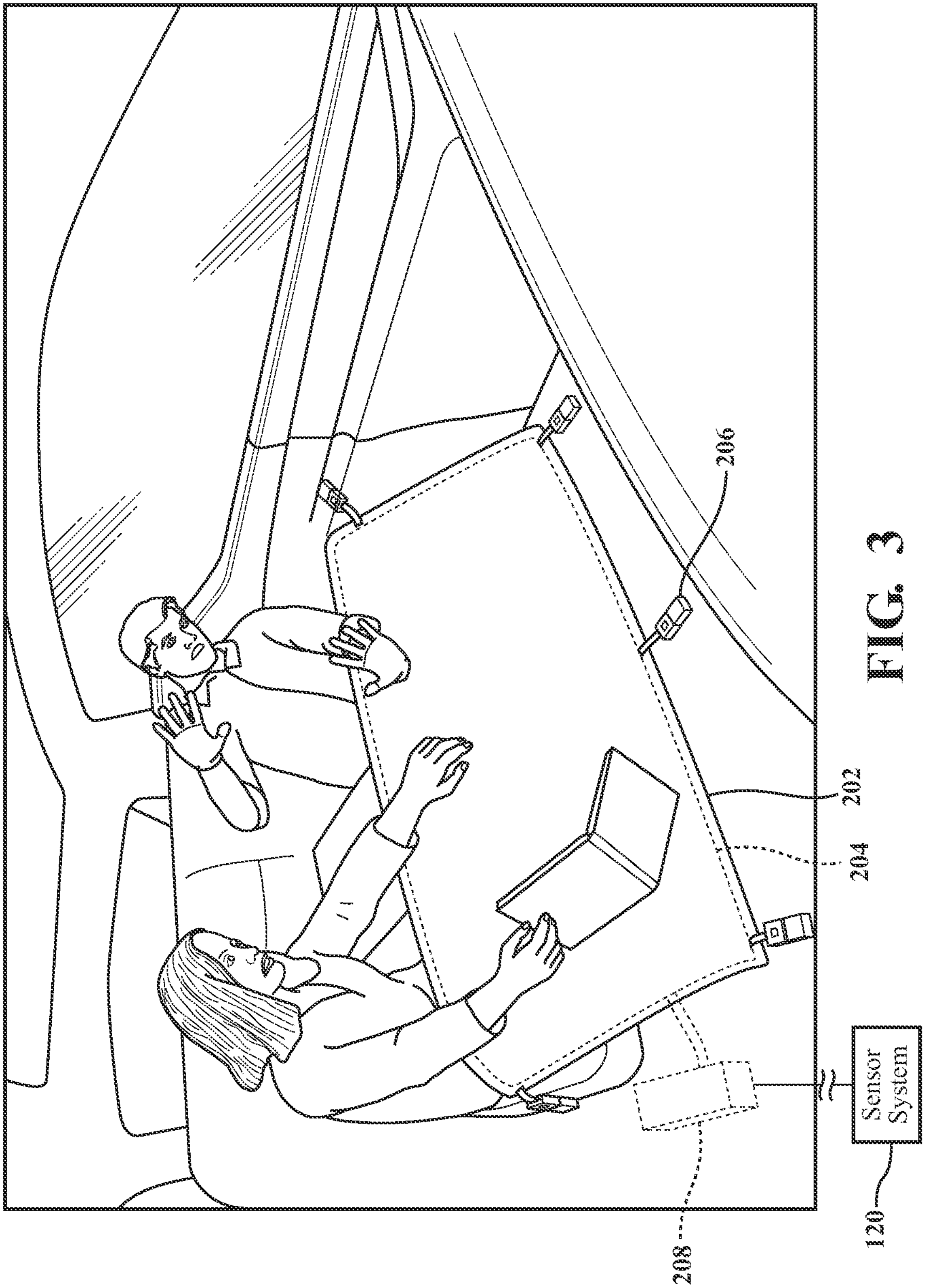
FIG. 3 illustrates one embodiment of a passenger restraint system in a rigid state that is associated with restraining a vehicle passenger via a variable-stiffness blanket.

FIG. 3 illustrates one embodiment of a passenger restraint system 170, in a rigid state, that is associated with restraining a vehicle passenger via a variable-stiffness blanket 202. As described above, once the air is removed from the blanket 202 via the action of the vacuum pump 208, the blanket 202 becomes tight across the passenger such that passenger motion under the blanket 202 is restricted.

Were the blanket 202 to remain loose and flexible, the passenger may be partially dislodged from the seat abruptly due to the impact forces. This movement may be dangerous to the passenger as the passenger may be thrown from the vehicle 100 or collide with components of the vehicle 100, either of which could injure the passenger. By comparison, with the blanket 202 stiffened and anchored, the passenger is retained in their seat and prevented from the harmful effects accompanying the crash were such movement not restricted. Thus, the present passenger restraint system 170 provides a comfortable, non-invasive passenger restraint mechanism that, in some cases, is triggered reactive to a crash, impact, or other hazardous event and/or an anticipated crash.

Throughout the hazardous event or pre-crash event, the vacuum pump 208 may maintain the vacuum on the anchored sealed blanket 202 to keep the blanket 202 rigid. After the danger of the hazardous event has passed, the vacuum pump 208 transitions the variable-stiffness material layers from the rigid state to the flexible state by releasing the vacuum on the sealed blanket 202. The vacuum release may be triggered by the sensor system 120 output. For example, once a pressure sensor that detects a collision indicates a decrease in pressure, which is indicative that the collision has ended, the vacuum may be released, thus allowing the passenger to exit the vehicle 100. In another example, the vacuum is maintained even after the conclusion of the hazardous event. Doing so may prevent further injury to the passenger. For example, in the unfortunate event that the vehicle 100 is upside down following an accident and the passenger is lifted off the ground, releasing the vacuum and allowing the blanket 202 to again become flexible may cause the passenger to drop from their elevated position, potentially further injuring the passenger. In this case, the passenger may be safely released from the passenger restraint system 170 by manual disengagement of the anchors 206 of the anchor system.

FIG. 4 illustrates a cross-sectional view of the set of variable-stiffness material layers 410-1, 410-2, and 410-3 of a passenger restraint system 170. As described above, the jamming structure 204 of the blanket 202 is formed of variable-stiffness material layers 410-1, 410-2, and 410-3. The material layers 410 may be formed of any flexible and/or bendable material. For example, the material layers 410 may be formed of a cellulose-based material, woven acrylic, nylon, a polymer thin film, or any other flexible material. Note that while FIG. 4 depicts three layers 410-1, 410-2, and 410-3, the jamming structure 204 may include any number of layers, wherein the number of layers is dependent upon the initial stiffness of the material. For example, a jamming structure 204 made of cloth fabric may have more layers than a jamming structure 204 made of a cellulose-based product such as paper because the paper has a greater initial stiffness. In some examples, the layers 410 may be formed of a material exposed to a surface treatment to increase the surface roughness. As described above, the stiffness of the jamming structure 204 is provided by the friction forces between adjacent layers 410. Increasing the surface roughness of the layers may increase the friction between adjacent layers when a vacuum is pulled.

As depicted in FIG. 4, the vacuum pump 208 is not activated such that air pockets exist between adjacent layers 410 of the set of layers. As such, the blanket 202 may be flexible and conform to the contours of the passengers over which it is draped.

By comparison, FIG. 5 depicts a scenario where the vacuum pump 208 is activated, thus drawing air out of the airtight blanket 202. In this example, the air pockets/gaps between adjacent layers 410 are removed. That is, the contact area between adjacent layers 410 is increased, which increases the frictional forces between adjacent layers 410 and results in the aforementioned stiffness of the jamming structure 204. Accordingly, as depicted in FIG. 5, the layers 410 are no longer flexible but stiff and straightened in some examples. In another example, rather than straightening the layers 410, pulling a vacuum may stiffen the layers 410 in their bent state. As such, rather than changing the cross-sectional shape of the blanket 202 as depicted in FIG. 5, pulling the vacuum may compress the layers 410 (for example, in their bent configuration depicted in FIG. 4) around the contours of the passenger. In either case (i.e., the layers 410 are straightened or the layers 410 are allowed to remain contoured), the layers 410 are stiffened and resist the movement force of the passenger body during an impact. This resistive component prevents the passenger from becoming dislodged during an impact, crash, or other hazardous event.

Figure 6:
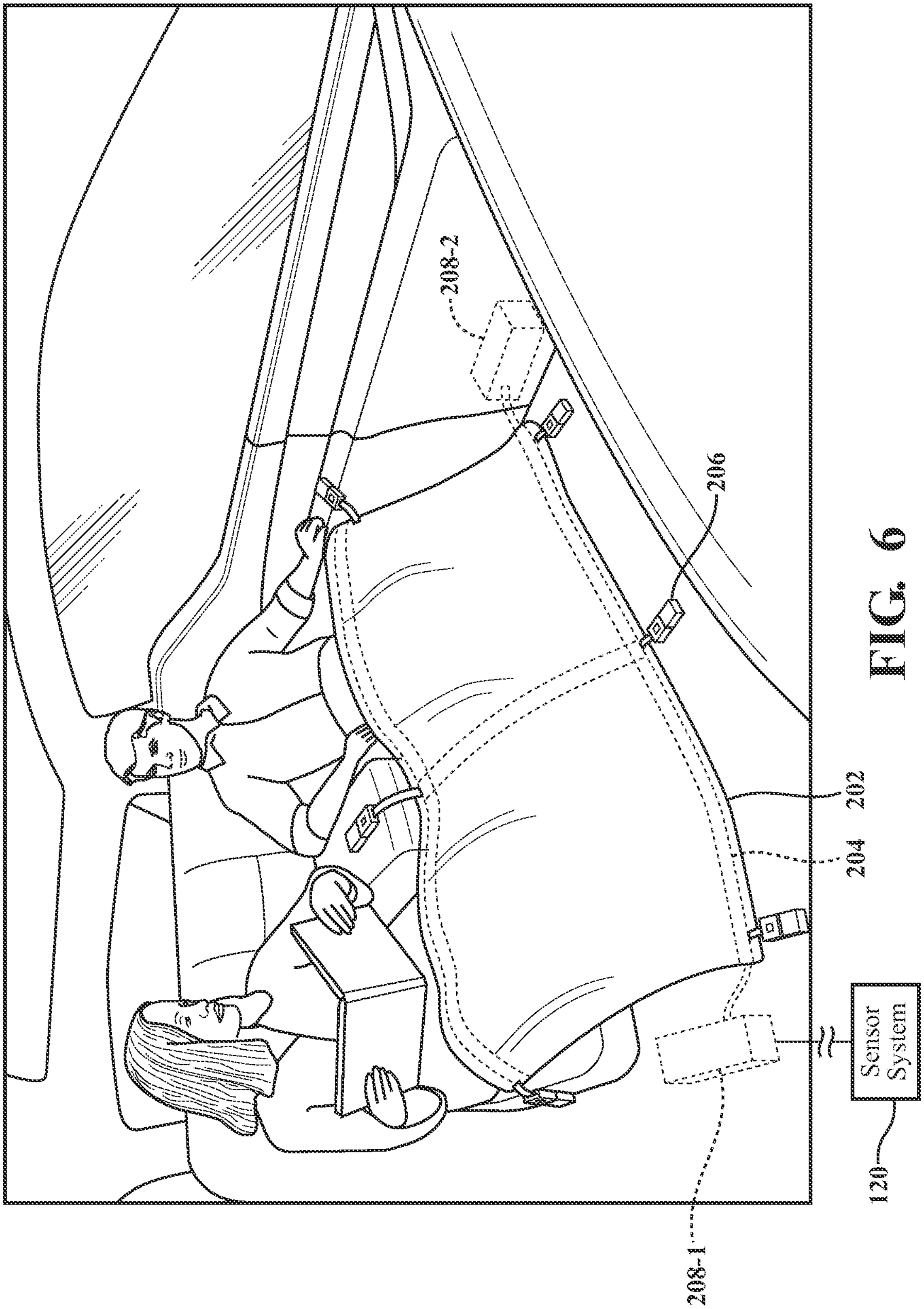
FIG. 6 illustrates one embodiment of a passenger restraint system in a flexible state that is associated with restraining a vehicle passenger via a variable-stiffness blanket.

FIG. 6 illustrates one embodiment of a passenger restraint system 170, in a flexible state, that is associated with restraining a vehicle passenger via a variable-stiffness blanket 202. In the example depicted in FIG. 6, the jamming structure 204 variable-stiffness material layers 410 are formed as strips within the sealed blanket 202. In this example, the passenger restraint system 170 further includes a container per strip to house a respective strip. That is, rather than the jamming structure 204 filling the entirety of the interior cavity of the blanket 202, the jamming structure 204 fills less than the entire cavity. Doing so may reduce the time to pull the vacuum or the size of the vacuum pump 208 used to pull the vacuum. That is, the volume of individual containers including variable-stiffness material layers 410 is less than that of the interior cavity of the blanket 202. As such, air may be withdrawn more quickly, or a smaller vacuum pump 208 may be used to pull the vacuum on the reduced volume space. In this example, the anchors 206 of the anchor system may still be affixed to the jamming structure 204 to provide the passenger safety-enhancing restraint described above. Note that in this example, the variable-stiffness material layers 410 are limited to particular regions of the interior cavity. Note also that while FIG. 6 depicts variable-stiffness material strips in particular locations in the blanket 202, the strips may be disposed in different portions of the blanket 202. For example, the strips may be disposed within a first portion of the sealed blanket 202 while a second portion of the sealed blanket 202 is free of strips. For example, a portion of the blanket to be draped over the torso of a passenger may include strips of variable-stiffness material layers 410. In contrast, an upper portion of the blanket 202 may be free of strips to increase its comfort and flexibility.

FIG. 6 also depicts an example where the passenger restraint system 170 includes multiple vacuum pumps 208-1 and 208-2. As described above, the hazardous event may occur quickly, so it may be desirable to pull a vacuum quickly and stiffen the jamming structure 204 to prevent passenger injury. Adding an additional vacuum pump 208 allows the passenger restraint system 170 to respond quickly to the hazardous event and restrain the passenger as needed, even in a quickly occurring hazardous event.

Figure 7:
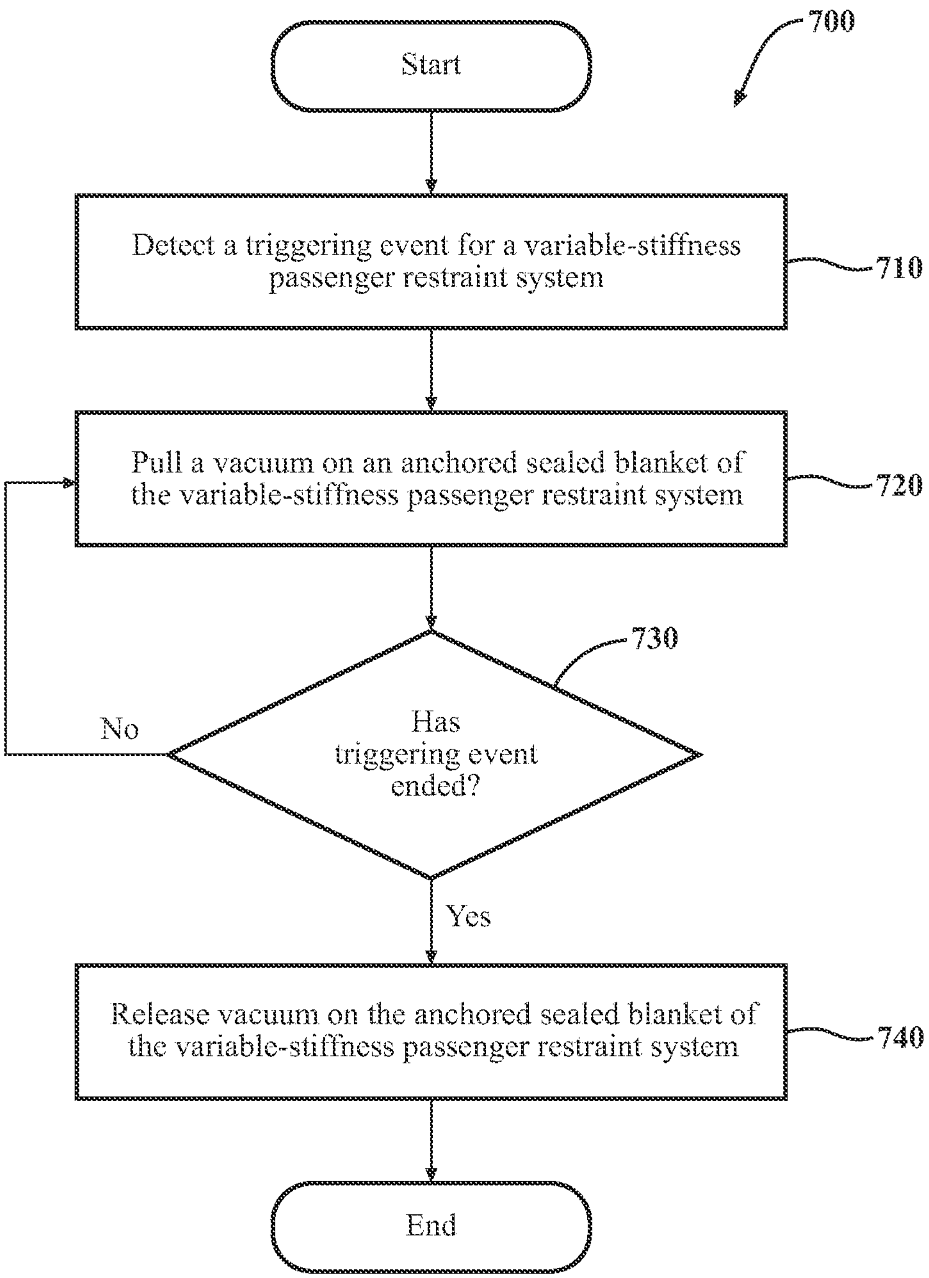
FIG. 7 illustrates a flowchart for one embodiment of a method that is associated with restraining a vehicle passenger via a variable-stiffness blanket.

Additional aspects of passenger restraint via a variable-stiffness jamming structure 204 will be discussed in relation to FIG. 7. FIG. 7 illustrates a flowchart of a method 700 that is associated with restraining a passenger via a jamming structure 204 that includes a set of variable-stiffness material layers 410. Method 700 will be discussed from the perspective of the passenger restraint system 170 of FIGS. 1 and 2. While method 700 is discussed in combination with the passenger restraint system 170, it should be appreciated that the method 700 is not limited to being implemented within the passenger restraint system 170 but is instead one example of a system that may implement the method 700.

At 710, the passenger restraint system 170, particularly a sensor of the sensor system 120 of the vehicle 100, detects a triggering event for the passenger restraint system 170. The triggering event may take a variety of forms and may include a crash event, a pre-crash event, or any other hazardous event detected by a vehicle sensor 121 and/or an environment sensor 122 of the sensor system 120 of the vehicle 100. As described, various pressure sensors may be disposed around the body of the vehicle 100 to detect an impact of the vehicle 100 with another vehicle or object. The output of this pressure sensor is transmitted in milliseconds to the passenger restraint system 170. In another example, the sensor may be a vehicle sensor, such as a tire sensor or steering wheel sensor, which detects a slip angle of the tire. If greater than a threshold amount of slip is detected, indicating that the vehicle 100 is spinning out, the passenger restraint system 170 may be activated. In another example, the triggering event may be a pre-crash event wherein an environment sensor 122 and/or a vehicle sensor 121 output is used to predict imminent collision or impact. Similarly, in this example, an output of the sensor triggers the activation of the passenger restraint system.

Figure 8:
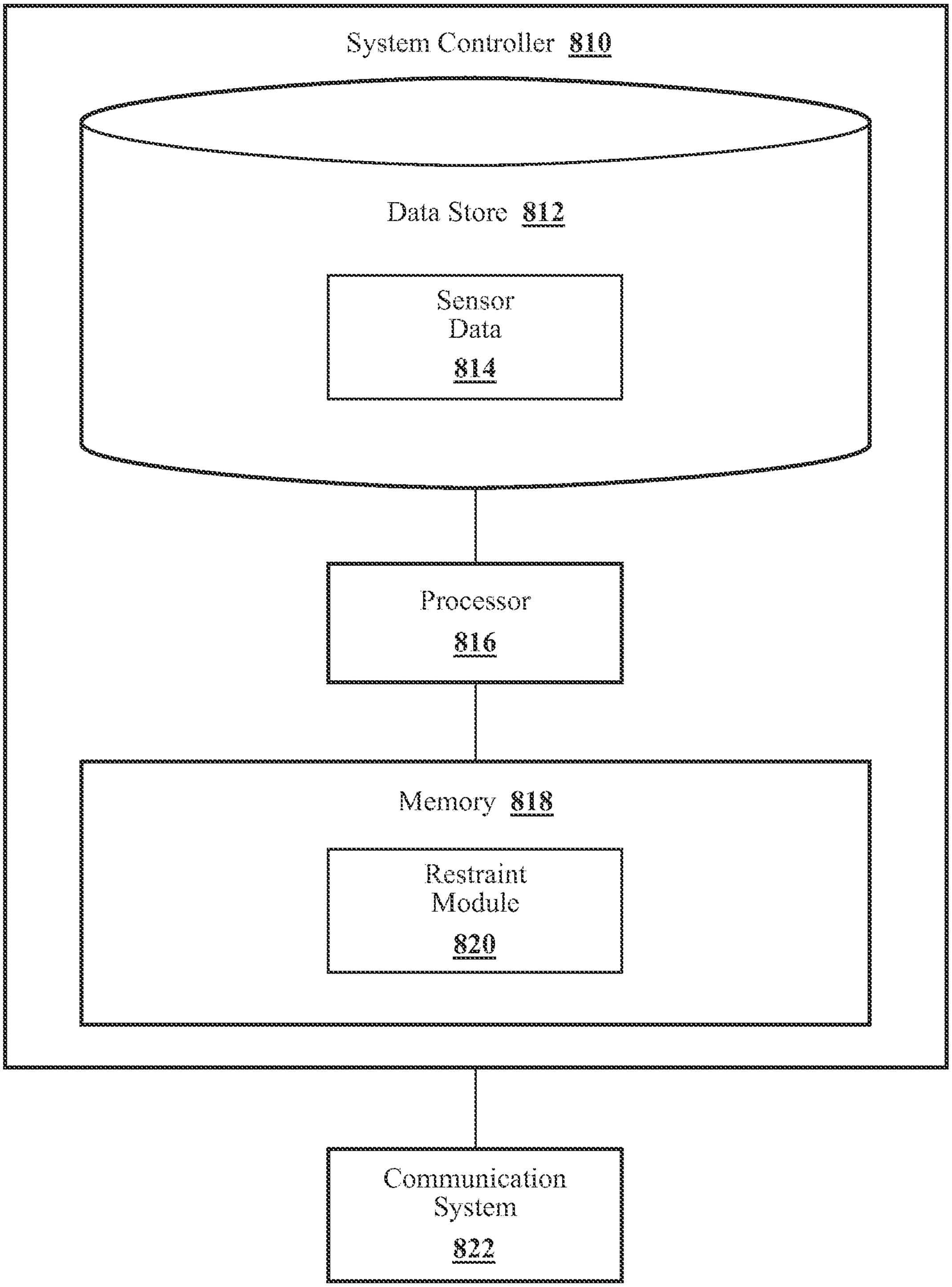
FIG. 8 illustrates one embodiment of a passenger restraint system controller that is associated with restraining a passenger via a variable-stiffness jamming structure.

It should be noted that in some examples, activation of the passenger restraint system 170 based on a detected sensor output may be effectuated by a controller of the passenger restraint system 170. That is, the passenger restraint system 170 may include a system controller 810. FIG. 8 below depicts an example of the system controller that may activate the vacuum pump 208 based on a detected triggering event. In other examples, the passenger restraint system 170 activation may be non-program instruction-based. For example, an electrical circuit between the sensor, such as an accelerometer, and the vacuum pump 208 may include a mechanical contact. When the sensor detects rapid deceleration, the mechanical contact in the sensor closes the circuit such that the vacuum pump 208 is activated. While particular reference is made to a particular mechanical-based system, other mechanical, non-program instruction-based systems may be implemented in the passenger restraint system 170.

In either case (i.e., a program instruction-based or a mechanical-based system), at 720, the vacuum pump 208 pulls a vacuum on an anchored sealed blanket 202 responsive to a detected triggering event. Doing so transitions the variable-stiffness material layers 410 from a flexible state, wherein the passenger may move relatively unrestricted underneath the blanket 202, to a rigid state, where the passenger movement is restricted to prevent injury to the passenger due to impact forces. In the example where a controller triggers activation of the vacuum pump 208, an electrical signal from the sensor system 120 may cause the system controller to generate a vacuum activation signal, which turns on the vacuum pump 208 to draw air from between the variable-stiffness material layers 410 to increase the friction/rigidity of the jamming structure.

As described above, it may be that the vacuum is maintained until after the triggering event has ended. As such, at 730 if the triggering event continues, the vacuum pump 208 continues to pull a vacuum on the interior cavity of the blanket 202. If, however, at 730 it is determined that the triggering event has ended, at 740, the vacuum pump 208 releases the vacuum on the anchored sealed blanket 202 such that the passenger may exit the vehicle 100.

It should be appreciated that in some examples, the method 700 may be performed by a system controller 810 of the passenger restraint system 170. That is, a system controller 810, via the communication system 822, may activate the vacuum pump 208 of the passenger restraint system 170. FIG. 8 illustrates one embodiment of a system controller 810 of the passenger restraint system 170 that is associated with restraining a passenger via a variable-stiffness jamming structure 204.

The system controller 810 is shown as including a processor 816. The processor 816 may be a part of the passenger restraint system 170, the system controller 810 may include a separate processor from the processor 110 of the vehicle 100, or the system controller may access the processor 110 through a data bus or another communication path that is separate from the vehicle 100. In one embodiment, the system controller 810 includes a memory 818 that stores a restraint module 820. The memory 818 is a random-access memory (RAM), read-only memory (ROM), a hard-disk drive, a flash memory, or another suitable memory for storing the restraint module 820. The restraint module 820 is, for example, computer-readable instructions that, when executed by the processor 816, cause the processor 816 to perform various functions disclosed herein. In alternative arrangements, the restraint module 820 is an independent element from the memory 818 that is, for example, comprised of hardware elements. Thus, the restraint module 820 is alternatively an ASIC, a hardware-based controller, a composition of logic gates, or another hardware-based solution.

Moreover, in one embodiment, the system controller 810 includes the data store 812. The data store 812 is, in one embodiment, an electronic data structure stored in the memory 818 or another data storage device and that is configured with routines that can be executed by the processor 816 for analyzing stored data, providing stored data, organizing stored data, and so on. Thus, in one embodiment, the data store 812 stores data used by the restraint module 820 in executing various functions. In one embodiment, the data store 812 stores the sensor data 814 along with, for example, metadata that characterizes various aspects of the sensor data 814. For example, the metadata can include location coordinates (e.g., longitude and latitude), relative map coordinates or tile identifiers, time/date stamps from when the separate sensor data 814 was generated, and so on. As described below, the sensor data 814 is data provided from one or more sensors of the sensor system 120. Thus, the sensor data 814 may include observations of a surrounding environment of the vehicle 100 and/or information about the vehicle 100 itself. As described above, the sensor data 814 may be relied on by the restraint module 820 to activate the passenger restraint system 170 components. Specifically, the sensor data 814 may indicate hazardous or pre-crash/hazardous events. This sensor data 814 is used by the restraint module 820 to activate the vacuum pump 208.

The restraint module 820, in one embodiment, includes instructions that cause the processor 816 to activate the vacuum pump 208 based on sensor data 814. As such, the restraint module 820 generally includes instructions that function to control the processor 816 to receive data inputs from one or more sensors of the vehicle 100. In one embodiment, the inputs are observations of one or more objects in an environment proximate to the vehicle 100 and/or other aspects about the surroundings. As provided for herein, the restraint module 820, in one embodiment, acquires sensor data 814 that includes at least camera images. In further arrangements, the restraint module 820 acquires the sensor data 814 from further sensors such as a radar sensor 123, a LiDAR sensor 124, and other sensors as may be suitable for identifying vehicles and locations of the vehicles.

Accordingly, the restraint module 820, in one embodiment, controls the respective sensors to provide the data inputs in the form of the sensor data 814. Additionally, while the restraint module 820 is discussed as controlling the various sensors to provide the sensor data 814, in one or more embodiments, the restraint module 820 can employ other techniques to acquire the sensor data 814 that are either active or passive. For example, the restraint module 820 may passively sniff the sensor data 814 from a stream of electronic information provided by the various sensors to further components within the vehicle 100. Moreover, the restraint module 820 can undertake various approaches to fuse data from multiple sensors when providing the sensor data 814 and/or from sensor data acquired over a wireless communication link (e.g., v2v) from one or more of the surrounding vehicles. Thus, the sensor data 814, in one embodiment, represents a combination of perceptions acquired from multiple sensors.

The sensor data 814 may include, for example, information about the environment surrounding the vehicle 100 and/or the vehicle 100 itself, and so on. Moreover, the restraint module 820, in one embodiment, controls the sensors to acquire the sensor data 814 about an area that encompasses 360 degrees about the vehicle 100 in order to provide a comprehensive assessment of the surrounding environment. Of course, in alternative embodiments, the restraint module 820 may acquire the sensor data about a forward direction alone when, for example, the vehicle 100 is not equipped with further sensors to include additional regions about the vehicle 100 and/or the additional regions are not scanned due to other reasons (e.g., unnecessary due to known current conditions).

Based on the sensor data 814, the restraint module 820 communicates with the vacuum pump 208 via the communication system 822 to draw air out of the blanket 202 to stiffen the jamming structure 204 and prevent injury to the passenger.

FIG. 1 will now be discussed in full detail as an example environment within which the system and methods disclosed herein may operate. In some instances, the vehicle 100 is configured to switch selectively between an autonomous mode, one or more semi-autonomous modes, and/or a manual mode. "Manual mode" means that all of or a majority of the control and/or maneuvering of the vehicle 100 is performed according to inputs received via manual human-machine interfaces (HMIs) (e.g., steering wheel, accelerator pedal, brake pedal, etc.) of the vehicle 100 as manipulated by a user (e.g., human driver). In one or more arrangements, the vehicle 100 can be a manually-controlled vehicle that is configured to operate in only the manual mode.

In one or more arrangements, the vehicle 100 implements some level of automation in order to operate autonomously or semi-autonomously. As used herein, automated control of the vehicle 100 is defined along a spectrum according to the SAE J3016 standard. The SAE J3016 standard defines six levels of automation from level zero to five. In general, as described herein, semi-autonomous mode refers to levels zero to two, while autonomous mode refers to levels three to five. Thus, the autonomous mode generally involves control and/or maneuvering of the vehicle 100 along a travel route via a computing system to control the vehicle 100 with minimal or no input from a human driver. By contrast, the semi-autonomous mode, which may also be referred to as advanced driving assistance system (ADAS), provides a portion of the control and/or maneuvering of the vehicle 100 via a computing system along a travel route with a vehicle operator (i.e., driver) providing at least a portion of the control and/or maneuvering of the vehicle 100.

With continued reference to the various components illustrated in FIG. 1, the vehicle 100 includes one or more processors 110. In one or more arrangements, the processor(s) 110 can be a primary/centralized processor of the vehicle 100 or may be representative of many distributed processing units. For instance, the processor(s) 110 can be an electronic control unit (ECU). Alternatively, or additionally, the processors include a central processing unit (CPU), a graphics processing unit (GPU), an ASIC, an microcontroller, a system on a chip (SoC), and/or other electronic processing units that support operation of the vehicle 100.

The vehicle 100 can include one or more data stores 115 for storing one or more types of data. The data store 115 can be comprised of volatile and/or non-volatile memory. Examples of memory that may form the data store 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, solid-state drivers (SSDs), and/or other non-transitory electronic storage medium. In one configuration, the data store 115 is a component of the processor(s) 110. In general, the data store 115 is operatively connected to the processor(s) 110 for use thereby. The term "operatively connected," as used throughout this description, can include direct or indirect connections, including connections without direct physical contact.

In one or more arrangements, the one or more data stores 115 include various data elements to support functions of the vehicle 100, such as semi-autonomous and/or autonomous functions. Thus, the data store 115 may store map data 116 and/or sensor data 119. The map data 116 includes, in at least one approach, maps of one or more geographic areas. In some instances, the map data 116 can include information about roads (e.g., lane and/or road maps), traffic control devices, road markings, structures, features, and/or landmarks in the one or more geographic areas. The map data 116 may be characterized, in at least one approach, as a high-definition (HD) map that provides information for autonomous and/or semi-autonomous functions.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. In one or more arrangements, the map data 116 includes one or more static obstacle maps 118. The static obstacle map(s) 118 can include information about one or more static obstacles located within one or more geographic areas. A "static obstacle" is a physical object whose position and general attributes do not substantially change over a period of time. Examples of static obstacles include trees, buildings, curbs, fences, and so on.

The sensor data 119 is data provided from one or more sensors of the sensor system 120. Thus, the sensor data 119 may include observations of a surrounding environment of the vehicle 100 and/or information about the vehicle 100 itself. In some instances, one or more data stores 115 located onboard the vehicle 100 store at least a portion of the map data 116 and/or the sensor data 119. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. As described herein, "sensor" means an electronic and/or mechanical device that generates an output (e.g., an electric signal) responsive to a physical phenomenon, such as electromagnetic radiation (EMR), sound, etc. The sensor system 120 and/or the one or more sensors can be operatively connected to the processor(s) 110, the data store(s) 115, and/or another element of the vehicle 100.

Various examples of different types of sensors will be described herein. However, it will be understood that the embodiments are not limited to the particular sensors described. In various configurations, the sensor system 120 includes one or more vehicle sensors 121 and/or one or more environment sensors. The vehicle sensor(s) 121 function to sense information about the vehicle 100 itself. In one or more arrangements, the vehicle sensor(s) 121 include one or more accelerometers, one or more gyroscopes, an inertial measurement unit (IMU), a dead-reckoning system, a global navigation satellite system (GNSS), a global positioning system (GPS), and/or other sensors for monitoring aspects about the vehicle 100.

As noted, the sensor system 120 can include one or more environment sensors 122 that sense a surrounding environment (e.g., external) of the vehicle 100 and/or, in at least one arrangement, an environment of a passenger cabin of the vehicle 100. For example, the one or more environment sensors 122 sense objects the surrounding environment of the vehicle 100. Such obstacles may be stationary objects and/or dynamic objects. Various examples of sensors of the sensor system 120 will be described herein. The example sensors may be part of the one or more environment sensors 122 and/or the one or more vehicle sensors 121. However, it will be understood that the embodiments are not limited to the particular sensors described. As an example, in one or more arrangements, the sensor system 120 includes one or more radar sensors 123, one or more LIDAR sensors 124, one or more sonar sensors 125 (e.g., ultrasonic sensors), and/or one or more cameras 126 (e.g., monocular, stereoscopic, RGB, infrared, etc.).

Continuing with the discussion of elements from FIG. 1, the vehicle 100 can include an input system 130. The input system 130 generally encompasses one or more devices that enable the acquisition of information by a machine from an outside source, such as an operator. The input system 130 can receive an input from a vehicle passenger (e.g., a driver/operator and/or a passenger). Additionally, in at least one configuration, the vehicle 100 includes an output system 135. The output system 135 includes, for example, one or more devices that enable information/data to be provided to external targets (e.g., a person, a vehicle passenger, another vehicle, another electronic device, etc.).

Furthermore, the vehicle 100 includes, in various arrangements, one or more vehicle systems 140. Various examples of the one or more vehicle systems 140 are shown in FIG. 1. However, the vehicle 100 can include a different arrangement of vehicle systems. It should be appreciated that although particular vehicle systems are separately defined, each or any of the systems or portions thereof may be otherwise combined or segregated via hardware and/or software within the vehicle 100. As illustrated, the vehicle 100 includes a propulsion system 141, a braking system 142, a steering system 143, a throttle system 144, a transmission system 145, a signaling system 146, and a navigation system 147.

The navigation system 147 can include one or more devices, applications, and/or combinations thereof to determine the geographic location of the vehicle 100 and/or to determine a travel route for the vehicle 100. The navigation system 147 can include one or more mapping applications to determine a travel route for the vehicle 100 according to, for example, the map data 116. The navigation system 147 may include or at least provide connection to a global positioning system, a local positioning system or a geolocation system.

In one or more configurations, the vehicle systems 140 function cooperatively with other components of the vehicle 100. For example, the processor(s) 110, the passenger restraint system 170, and/or automated driving module(s) 160 can be operatively connected to communicate with the various vehicle systems 140 and/or individual components thereof. For example, the processor(s) 110 and/or the automated driving module(s) 160 can be in communication to send and/or receive information from the various vehicle systems 140 to control the navigation and/or maneuvering of the vehicle 100. The processor(s) 110 and/or the automated driving module(s) 160 may control some or all of these vehicle systems 140.

For example, when operating in the autonomous mode, the processor(s) 110 and/or the automated driving module(s) 160 control the heading and speed of the vehicle 100. The processor(s) 110 and/or the automated driving module(s) 160 cause the vehicle 100 to accelerate (e.g., by increasing the supply of energy/fuel provided to a motor), decelerate (e.g., by applying brakes), and/or change direction (e.g., by steering the front two wheels). As used herein, "cause" or "causing" means to make, force, compel, direct, command, instruct, and/or enable an event or action to occur either in a direct or indirect manner.

As shown, the vehicle 100 includes one or more actuators 150 in at least one configuration. The actuators 150 are, for example, elements operable to move and/or control a mechanism, such as one or more of the vehicle systems 140 or components thereof responsive to electronic signals or other inputs from the processor(s) 110 and/or the automated driving module(s) 160. The one or more actuators 150 may include motors, pneumatic actuators, hydraulic pistons, relays, solenoids, piezoelectric actuators, and/or another form of actuator that generates the desired control.

As described previously, the vehicle 100 can include one or more modules, at least some of which are described herein. In at least one arrangement, the modules are implemented as non-transitory computer-readable instructions that, when executed by the processor 110, implement one or more of the various functions described herein. In various arrangements, one or more of the modules are a component of the processor(s) 110, or one or more of the modules are executed on and/or distributed among other processing systems to which the processor(s) 110 is operatively connected. Alternatively, or in addition, the one or more modules are implemented, at least partially, within hardware. For example, the one or more modules may be comprised of a combination of logic gates (e.g., metal-oxide-semiconductor field-effect transistors (MOSFETs)) arranged to achieve the described functions, an application-specific integrated circuit (ASIC), programmable logic array (PLA), field-programmable gate array (FPGA), and/or another electronic hardware-based implementation to implement the described functions. Further, in one or more arrangements, one or more of the modules can be distributed among a plurality of the modules described herein. In one or more arrangements, two or more of the modules described herein can be combined into a single module.

Furthermore, the vehicle 100 may include one or more automated driving modules 160. The automated driving module(s) 160, in at least one approach, receive data from the sensor system 120 and/or other systems associated with the vehicle 100. In one or more arrangements, the automated driving module(s) 160 use such data to perceive a surrounding environment of the vehicle. The automated driving module(s) 160 determine a position of the vehicle 100 in the surrounding environment and map aspects of the surrounding environment. For example, the automated driving module(s) 160 determines the location of obstacles or other environmental features including traffic signs, trees, shrubs, neighboring vehicles, pedestrians, etc.

The automated driving module(s) 160 can be configured to determine travel path(s), current autonomous driving maneuvers for the vehicle 100, future autonomous driving maneuvers and/or modifications to current autonomous driving maneuvers based on data acquired by the sensor system 120 and/or another source. In general, the automated driving module(s) 160 functions to, for example, implement different levels of automation, including advanced driving assistance (ADAS) functions, semi-autonomous functions, and fully autonomous functions, as previously described.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-8, but the embodiments are not limited to the illustrated structure or application.

As described above, the flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

As described above, the vacuum controller described above can be realized in hardware or a combination of hardware and software and can be realized in a centralized fashion in one processing system or in a distributed fashion where different elements are spread across several interconnected processing systems. The vacuum controller and/or processes also can be embedded in a computer-readable storage, such as a computer program product or other data program storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. A non-exhaustive list of the computer-readable storage medium can include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or a combination of the foregoing. In the context of this document, a computer-readable storage medium is, for example, a tangible medium that stores a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

The invention claimed is:

1. A passenger restraint system, comprising:

a sealed blanket configured to extend over a passenger;

a set of variable-stiffness material layers disposed within the sealed blanket, the set of variable-stiffness material layers having a flexible state and a rigid state;

an anchor system attached to the sealed blanket to fasten the sealed blanket to an interior cabin of a vehicle; and a vacuum pump to pull a vacuum within the sealed blanket and transition the variable-stiffness material layers from the flexible state to the rigid state.

2. The passenger restraint system of claim 1, further comprising:

a sensor to detect a triggering event at the vehicle; and a vacuum controller to activate the vacuum pump responsive to a detected triggering event.

3. The passenger restraint system of claim 2, wherein the sensor is an environment sensor of the vehicle and wherein the triggering event is at least one of a hazardous event or a pre-crash event detected by the environment sensor of the vehicle.

4. The passenger restraint system of claim 1, wherein:

the set of variable-stiffness material layers are formed as strips within the sealed blanket; and the passenger restraint system further comprises a container per strip to house a respective strip.

5. The passenger restraint system of claim 4, wherein:

the strips are disposed within a first portion of the sealed blanket; and a second portion of the sealed blanket is free of strips.

6. The passenger restraint system of claim 1, wherein the anchor system comprises multiple anchors fastening the sealed blanket to the interior cabin of the vehicle at different anchor points.

7. The passenger restraint system of claim 1, further comprising at least one additional vacuum pump to pull the vacuum within the sealed blanket.

8. The passenger restraint system of claim 1, wherein the vacuum pump transitions the set of variable-stiffness material layers from the rigid state to the flexible state by releasing the vacuum.

9. The passenger restraint system of claim 1, wherein the set of variable-stiffness material layers comprise a cellulose-based material.

10. A passenger restraint system, comprising:

a sealed blanket configured to extend over a passenger;

an anchor system attached to the sealed blanket to fasten the sealed blanket to an interior cabin of a vehicle;

a set of variable-stiffness material layers disposed within the sealed blanket;

a sensor in the vehicle to detect a triggering event; and a vacuum pump to, responsive to the triggering event, pull a vacuum within the sealed blanket to transition the set of variable-stiffness material layers from a flexible state to a rigid state.

11. The passenger restraint system of claim 10, further comprising a vacuum controller to activate the vacuum pump responsive to a detected triggering event.

12. The passenger restraint system of claim 11, wherein the sensor is a vehicle sensor of the vehicle and the triggering event is at least one of a hazardous event or a pre-crash event detected by the vehicle sensor of the vehicle.

13. The passenger restraint system of claim 10, wherein the anchor system comprises multiple anchors fastening the sealed blanket to the interior cabin of the vehicle at different anchor points.

14. The passenger restraint system of claim 10, wherein:

the set of variable-stiffness material layers are formed as strips within the sealed blanket; and the passenger restraint system further comprises a container per strip to house a respective strip.

15. The passenger restraint system of claim 10, wherein the vacuum pump transitions the set of variable-stiffness material layers from the rigid state to the flexible state by releasing the vacuum.

16. The passenger restraint system of claim 10, wherein the set of variable-stiffness material layers are formed of a cellulose-based material.

17. A method, comprising:

detecting, with a sensor of a vehicle, a triggering event for a passenger restraint system of the vehicle; and responsive to detecting the triggering event, pulling a vacuum on an anchored sealed blanket of the passenger restraint system to transition a set of variable-stiffness material layers within the anchored sealed blanket from a flexible state to a rigid state.

18. The method of claim 17, wherein the triggering event is at least one of a hazardous event or a pre-crash event.

19. The method of claim 18, further comprising maintaining the vacuum on the anchored sealed blanket throughout the hazardous event or the pre-crash event.

20. The method of claim 17, further comprising, at a conclusion of the triggering event, releasing the vacuum on the anchored sealed blanket to transition the set of variable-stiffness material layers from the rigid state to the flexible state.

* * * * *